March 23, 1954     L. L. SELLARDS     2,673,261
TIRE DEFLATION INDICATOR FOR AUTOMOTIVE VEHICLES
Filed April 4, 1952

INVENTOR
LYLE L. SELLARDS
BY
McMorrow, Berman + Davidson
ATTORNEYS

Patented Mar. 23, 1954

2,673,261

UNITED STATES PATENT OFFICE 2,673,261

TIRE DEFLATION INDICATOR FOR AUTOMOTIVE VEHICLES

Lyle L. Sellards, San Antonio, Tex.

Application April 4, 1952, Serial No. 280,554

2 Claims. (Cl. 200—61.24)

This invention relates to tire deflation indicators for automotive vehicles and more particularly to electrically energized apparatus for indicating a low pressure condition in any of the pneumatic tires supporting a vehicle on which the apparatus is installed.

It is among the objects of the invention to provide an improved tire deflation indicator for an automotive vehicle which indicator can be easily installed in multiple on an automotive vehicle so that one indicator is located adjacent each of the supporting tires of the vehicle, and electrically connected to a common signal device to provide a warning signal in the event of deflation of any one of the vehicle tires; which contacts the ground or roadway when the associated tire is deflated or dangerously underinflated but is of resilient construction to avoid damage by such contact; which is substantially concealed by the associated vehicle wheel and does not detract from the appearance of the vehicle; which is effective to provide a ground connection for the energizing circuit of the signal device when the corresponding tire is deflated; and which is simple and durable in construction, economical to manufacture and install, and positive an effective in operation.

Other objects and advantages will become apparent from a consideration of the following description and the appended claims in conjunction with the accompanying drawing wherein:

Figure 1:
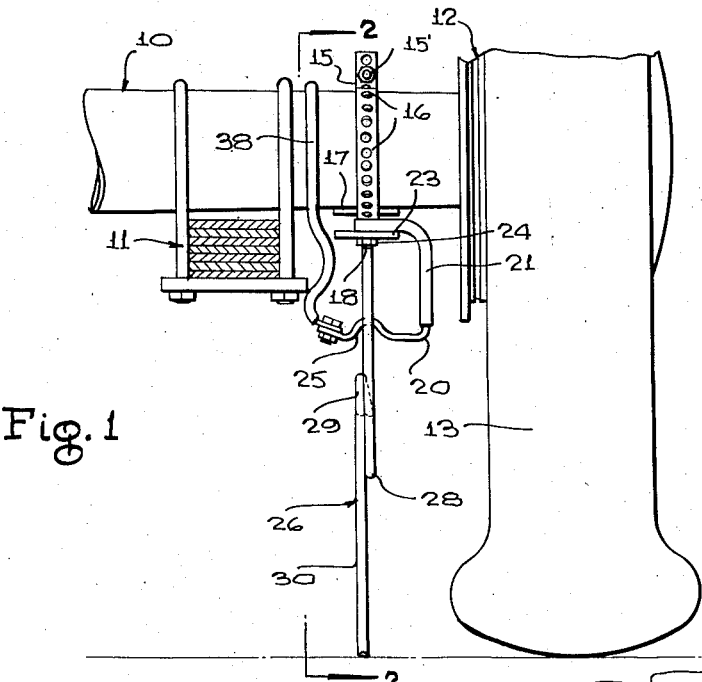
Figure 1 is a fragmentary elevational view of an automotive vehicle showing a tire deflation indicator illustrative of the invention operatively mounted on the vehicle adjacent one of the vehicle supporting tires.
Figure 2:
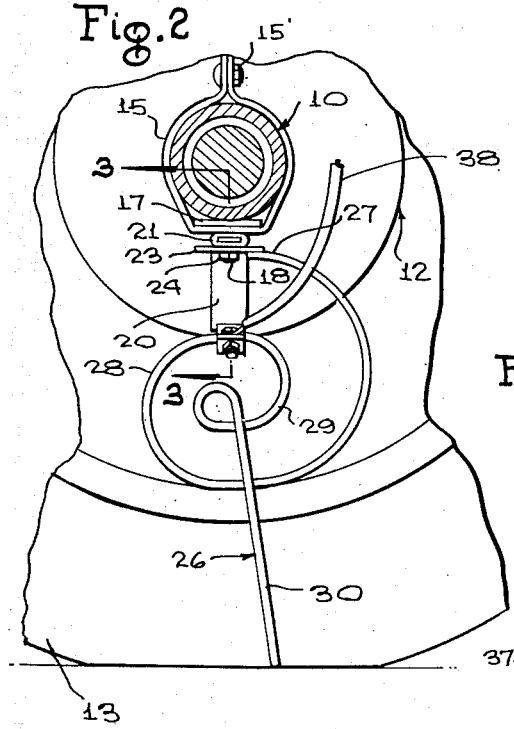
Figure 2 is a cross sectional view on the line 2—2 of Figure 1.
Figure 3:
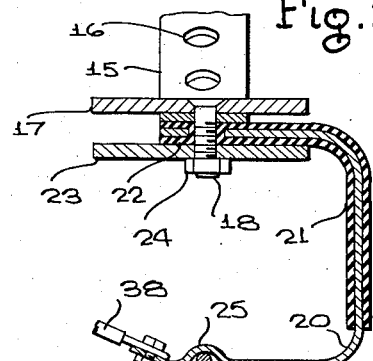
Figure 3 is a fragmentary cross sectional view on the line 3—3 of Figure 2.

With continued reference to the drawing, the numeral 10 generally indicates a vehicle axle carrying a spring 11 which supports the vehicle frame from the axle and the numeral 12 generally indicates the vehicle wheel mounted on the axle 10 and equipped with a pneumatic tire 13.

The tire deflation indicating device comprises a clamp 15 in the form of an elongated strip of flexible sheet material, such as sheet metal, having apertures 16 spaced apart longitudinally thereof and having a disc 17 secured to one side adjacent the midlength location thereof.

The clamp strip 15 is adapted to extend around the vehicle axle 10 and embracingly engage the axle and a clamp screw 15' is inserted through registering apertures in the strip at the upper side of the axle and firmly binds the clamp strip around the axle with the disc 17 firmly secured against the underside of the axle.

While the clamp is shown as extending around and secured to a vehicle axle, it is to be understood that it may be secured to other vehicle parts such as a front wheel spindle or suspension bar, a tie rod or a spring.

A bolt 18 is secured at one end to the disc 17 centrally of the latter and extends through an aperture in the clamp strip 15 in a direction downwardly from the associated axle 10.

A U-shaped bracket 20 in the form of a strip of resilient metal is secured at one end to the disc 17 by the bolt 18. A sleeve or cover 21 of electrically insulative material encloses the portion of the bracket strip 20 adjacent the disc 17 and the bracket strip is provided near one end thereof with an aperture through which the bolt 18 extends. A sleeve 22 of electrically insulative material extends through the aperture in the bracket strip in surrounding relationship to the bolt and a washer 23 is disposed against the side of the bracket remote from the disc 17 and provided with an aperture receiving the bolt 18. A nut 24 is threaded onto the lower screw threaded end of the bolt 18 and compresses the corresponding end portion of the bracket 20 between the disc 17 and the washer 23.

The sleeve 21 of electrically insulative material terminates short of the end of the bracket 20 remote from the bolt 18 and the bracket strip 20 is provided near its end remote from the bolt 18 with a longitudinally curved portion 25 having its concave side at the bottom side of the corresponding bracket leg.

A looped wire spring, generally indicated at 26, is secured at one end to the washer 23 by suitable means, such as by being welded to the washer as indicated at 27, and this wire is curved to provide an outside coil 28 extending from the end of the wire attached to the washer 23 and an inside coil 29 within the outside coil 28. A straight portion or leg 30 of the wire spring extends from the end of the inner coil 29 downwardly and has its distal end positioned adjacent the side wall of the tire 13 and at an elevation such that it is clear of the ground or roadway when the tire is inflated but comes into contact with the ground or roadway when the tire is deflated.

The end portion of the outer coil 28 adjacent the inner coil 29 passes below the curved portion 25 of the bracket 20 in spaced relationship to the bracket such that it is out of contact with the bracket when the associated tire is fully inflated but is forced upwardly into electrically conducted contact with the bracket when the tire is deflated and the distal end of the straight leg 30 of the wire spring comes into contact with the ground or roadway on which the tire is supported.

As the wire spring 26, the washer 23, bolt 18, and disc 17 are all of electrically conductive material, when the wire spring contacts the bracket 20 a ground connection is provided between the bracket 20 and the axle 10 of the vehicle or other portion of the vehicle on which the clamp 15 is mounted.

A signal device 31, such as an electric lamp, is mounted on the vehicle for observation by the vehicle driver and is connected at one side through a conductor 32 with one side of the ignition switch 33 of the vehicle. The other side of the ignition switch is connected through a conductor 34 and ammeter 35 with one side of the vehicle battery 36 the other side of which is grounded through the vehicle frame, as indicated at 37. A conductor 38 leads from the other side of the signal lamp 31 and it is apparent that when a ground connection is made between the conductor 38 and the vehicle frame the lamp 31 will be illuminated.

Figure 4:
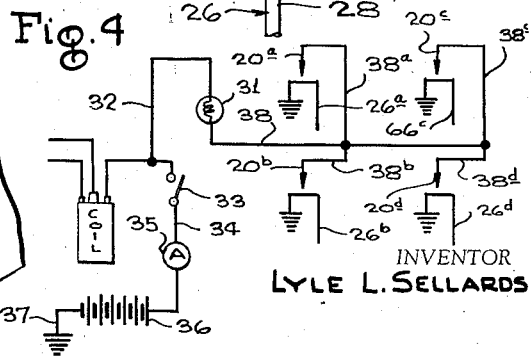
Figure 4 is a wiring diagram for the indicating apparatus.

The conductor 38 is connected by branch conductors 38a, 38b, 38c and 38d to the several brackets, as indicated at 20a, 20b, 20c and 20d in Figure 4. When any one of the wire springs, as indicated at 26a, 26b, 26c and 26d contacts its associated bracket a ground connection is provided for the conductor 38 and an energizing circuit is thereby established for the signal lamp 31 so that the lamp will be illuminated and warn the vehicle driver of the deflation of one of the vehicle tires.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A switch for a tire deflation indicator for an automotive vehicle comprising an adjustable clamp adapted to embracingly engage a structural part of a vehicle adjacent a vehicle tire, a U-shaped bracket, means securing said bracket at one end to said clamp with the other end of the bracket spaced from the clamp, means electrically insulating said bracket from said clamp, a looped wire spring secured at one end to said means connecting the bracket to the clamp and adapted to contact a roadway at its other end upon deflation of an associated vehicle tire, said spring having a portion spaced from said bracket near said other end of the latter and contacting said bracket to provide a ground contact when said other end of the spring engages a roadway, said wire spring comprising a length of resilient wire longitudinally curved to provide an outer coil extending from one end thereof, an inner coil disposed within said outer coil and a straight leg extending from the end of said inner coil remote from said outer coil, said wire spring being attached at said one end thereof to said means connecting the bracket to the clamp and having a portion of the outer coil thereof disposed adjacent the end of said bracket remote from said clamp.

2. A switch for a tire deflation indicator for an automotive vehicle comprising a clamp adapted to embracingly engage a structural part of a vehicle adjacent a vehicle tire, a U-shaped bracket fabricated of resilient material and positioned in a vertical plane below said clamp with its legs horizontally disposed and spaced vertically from each other and its bight vertically disposed, means securing the leg of said bracket adjacent said clamp to the latter, means electrically insulating said bracket from said clamp, and a vertically disposed looped wire spring secured at the upper end to said means securing the leg of the bracket to the clamp and having the lower end adapted to contact a roadway upon deflation of an associated vehicle tire, said spring having a portion intermediate its ends and contacting the other leg of said bracket to provide a ground contact when the lower end of the spring engages a roadway.

LYLE L. SELLARDS.

References Cited in the file of this patent

UNITED STATES PATENTS

| Number | Name | Date |
|---|---|---|
| 1,646,164 | Moscate | Oct. 18, 1927 |
| 2,191,205 | Rogers | Feb. 20, 1940 |
| 2,213,782 | Kite | Sept. 3, 1940 |
| 2,258,334 | Miller | Oct. 7, 1941 |